(12) United States Patent
Finke et al.

(10) Patent No.: US 6,471,508 B1
(45) Date of Patent: Oct. 29, 2002

(54) BURNER FOR NON-SYMMETRICAL COMBUSTION AND METHOD

(75) Inventors: Harry P. Finke, Pittsburgh, PA (US); Martin R. McGhee, Cornelius, NC (US); Gregory T. Kitko, Evansville, IN (US)

(73) Assignee: Bloom Engineering Company, Inc., Pittsburgh, PA (US)

( * ) Notice: Subject to any disclaimer, the term of this patent is extended or adjusted under 35 U.S.C. 154(b) by 0 days.

(21) Appl. No.: 09/744,845

(22) PCT Filed: Jul. 28, 1999

(86) PCT No.: PCT/US99/17075
§ 371 (c)(1),
(2), (4) Date: Aug. 29, 2001

(87) PCT Pub. No.: WO00/06946
PCT Pub. Date: Feb. 10, 2000

Related U.S. Application Data

(60) Provisional application No. 60/094,607, filed on Jul. 30, 1998.

(51) Int. Cl.[7] .............................. F23C 3/00; F23D 14/12
(52) U.S. Cl. ..................... 431/215; 431/11; 431/353; 431/180; 431/183
(58) Field of Search ............................ 431/9, 11, 215, 431/353, 180, 183; 432/180; 126/91 A

(56) References Cited

U.S. PATENT DOCUMENTS

| 2,250,680 A | 7/1941 | Schlitt |
| 2,398,611 A | 4/1946 | Beggs |
| 3,876,362 A | 4/1975 | Hirose |
| 4,439,137 A | 3/1984 | Suzuki et al. |
| 4,911,637 A | 3/1990 | Moore et al. |
| 4,945,841 A | * 8/1990 | Nakamachi et al. |
| 5,743,723 A | * 4/1998 | Iatrides et al. |

FOREIGN PATENT DOCUMENTS

| EP | 0040526 | * 11/1981 | ................. 431/215 |
| JP | 134410 | 6/1987 | |
| JP | 6193824 | 7/1994 | |
| JP | 08-128608 | * 2/1996 | ................. 431/215 |
| JP | 09-217904 | * 8/1997 | ................. 431/215 |
| JP | 10-89614 | * 4/1998 | ................. 431/215 |
| JP | 10-176809 | * 6/1998 | ................. 431/215 |
| JP | 10-176810 | * 6/1998 | ................. 431/215 |
| WO | 9609496 | 3/1996 | |
| WO | WO 96/09496 | * 3/1996 | |

* cited by examiner

Primary Examiner—Carl D. Price
(74) Attorney, Agent, or Firm—Webb Ziesenheim Logsdon Orkin & Hanson, P.C.

(57) ABSTRACT

A burner for non-symmetrical combustion includes a burner housing enclosing a burner plenum. A fuel conduit extends longitudinally within the housing and is positioned coaxial with a line spaced from a central axis of the burner. The fuel conduit defines a fuel exit opening. An air conduit extends into the housing and defines an air opening on an opposite side of the burner central axis from the fuel exit opening. The air opening is positioned a greater distance away from the burner central axis than the fuel exit opening. The air conduit has a cross-sectional shape in the form of a segment of a circle. A baffle is positioned at least partially around the fuel conduit and defines the air conduit. A burner port block is connected to the baffle downstream of the fuel exit opening. The burner port block has a sidewall diverging from the burner central axis.

22 Claims, 2 Drawing Sheets

BURNER FOR NON-SYMMETRICAL COMBUSTION AND METHOD

This application claims the benefit of Provisional application No. 60/094,607, filed Jul. 30, 1998.

BACKGROUND OF THE INVENTION

1. Field of the Invention

This invention relates to industrial burners and, more particularly, recuperative and regenerative burners which utilize the Coanda Effect.

2. Description of the Prior Art

Conventional industrial burners are typically configured in a symmetrical fashion. In this symmetrical configuration, a fuel conduit is generally disposed axially along a centerline of the burner and combustion air is generally introduced immediately about a periphery of the fuel conduit or, with appropriate air ducting, symmetrically about the fuel conduit and radially spaced therefrom. A prior art example of a symmetrical industrial burner is disclosed by U.S. Pat. No. 3,876,362 to Hirose. The symmetrical or "axial" burner disclosed by the Hirose patent attempts to induce a deflected stream of gas from the burner by providing an air inlet in the burner tile structure. The positive axial mass flux of the air and fuel jets cause a recirculation of POC from the furnace chamber into the burner tile. This induction of POC into the burner tile and subsequent entrainment into the fuel and air streams causes lower flame temperatures and lower NOx production rates.

An object of the present invention is to provide a burner that obtains NOx levels lower than those disclosed in the Hirose patent.

It is a further object of the present invention to address the problem of saving space in burner constructions, particularly as applied to regenerative and recuperative burners.

It is still a further object of the present invention to maximize air and fuel entrainment with products of combustion through means of a burner configuration that minimizes NOx formation.

SUMMARY OF THE INVENTION

The above objects are accomplished with a burner for non-symmetrical combustion made in accordance with the present invention. The burner generally includes a burner housing enclosing a burner plenum. A fuel conduit extends longitudinally within the housing and is positioned coaxial with a line spaced from a central axis of the burner. The fuel conduit defines a fuel exit opening. An air conduit extends into the housing and defines an air opening on an opposite side of the burner central axis from the fuel exit opening. The air opening is preferably positioned a greater distance away from the burner central axis than the fuel exit opening. The air conduit may have a cross-sectional shape in the form of a circle segment defined by a chord.

A baffle is preferably positioned at least partially around the fuel conduit and defines the air conduit. The baffle may further define a primary stabilization cavity immediately adjacent the fuel exit opening. The cavity may be in fluid communication with the fuel conduit through the fuel exit opening. The cavity may be cylindrical-shaped and coaxial with the fuel conduit.

A burner port block may be connected to the baffle downstream of the fuel exit opening. The burner port block preferably has a sidewall diverging from the burner central axis. The sidewall preferably diverges at a flare angle of between approximately 2° and approximately 30°. The baffle may separate the burner port block from the burner plenum. A combustion gas conduit may extend through the burner plenum and connect to the cavity. The fuel conduit may be positioned within the combustion gas conduit. Swirl vanes may be positioned within the combustion gas conduit and be peripherally spaced around the fuel conduit. An auxiliary fuel conduit may extend through the burner plenum and connect to the burner port block. The auxiliary fuel conduit may define an auxiliary fuel exit opening radially spaced from the fuel exit opening and coterminous with the burner port block. The fuel exit opening may be positioned on the opposite side of the burner central axis from the air opening.

The burner plenum may at least be partially filled with heat transfer media. Alternatively, the burner plenum may be connected to a diverter valve configured to selectively admit combustion gas into the combustion gas conduit. The present invention also includes a method of non-symmetric combustion.

Further details and advantages of the present invention will become apparent from the following detailed description in conjunction with the accompanying drawings, wherein like reference numerals designate like parts throughout.

DETAILED DESCRIPTION OF THE PREFERRED EMBODIMENTS

Figure 1:
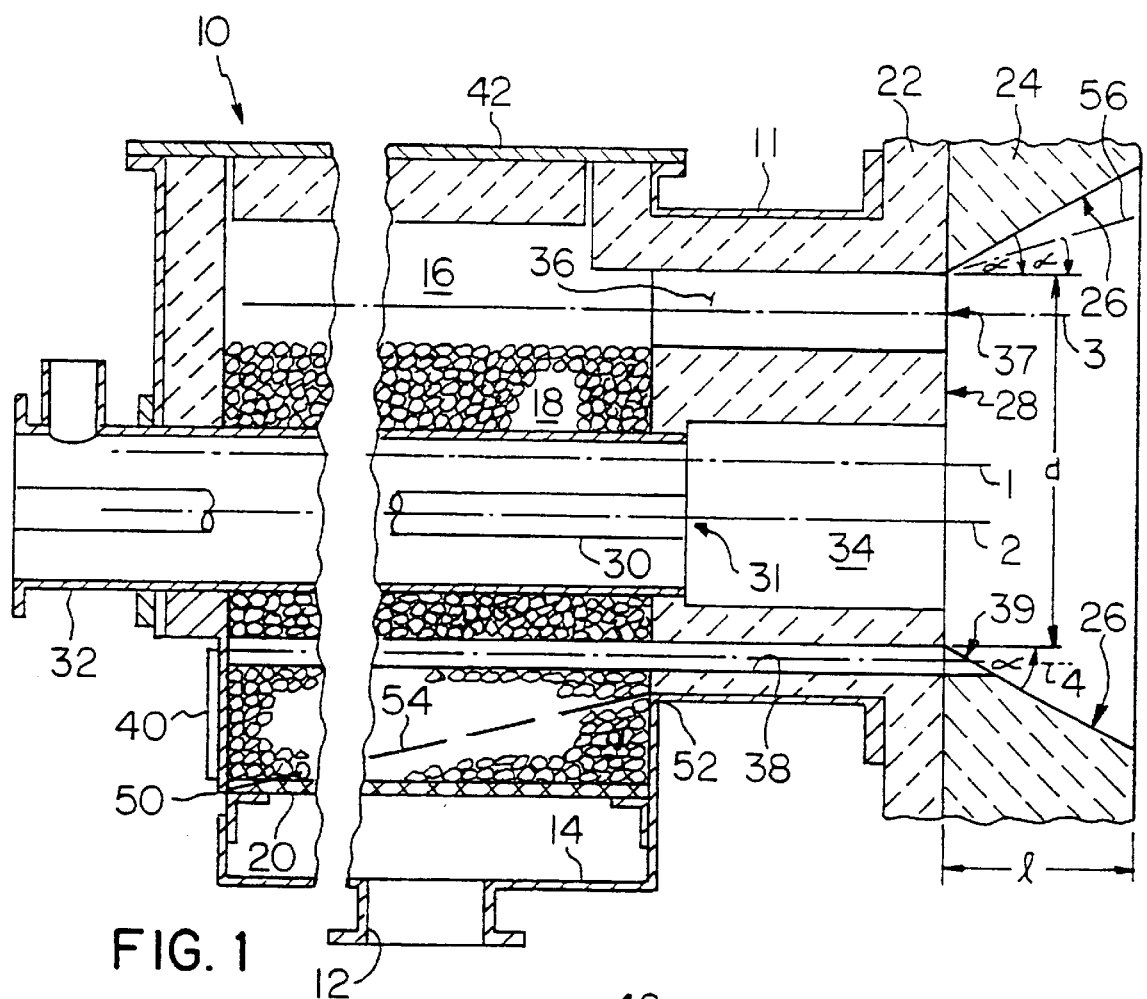
FIG. 1 is a cross-sectional view along a longitudinal axis of a regenerative burner for non-symmetrical combustion according to a first embodiment of the present invention.
Figure 2:
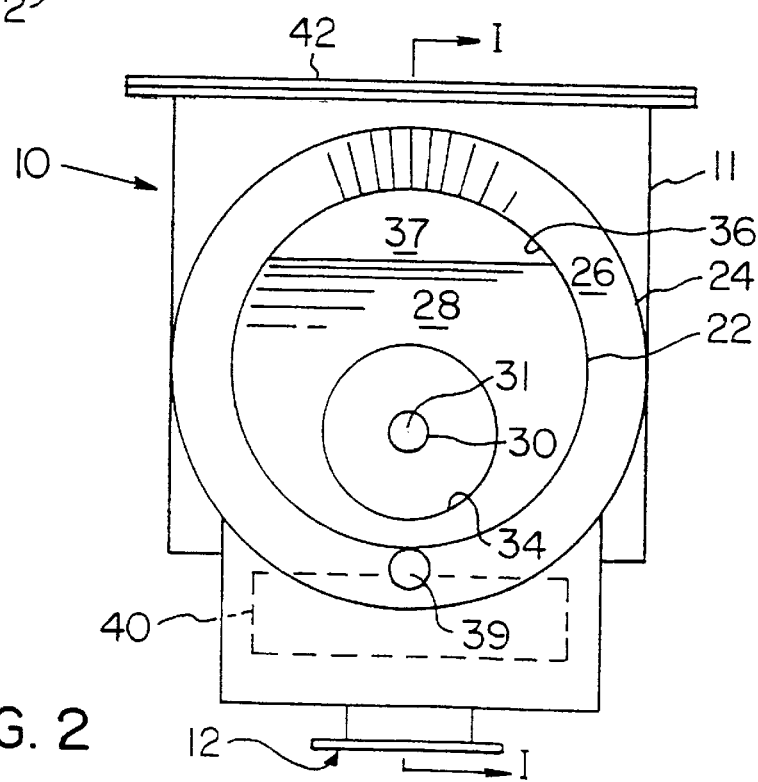
FIG. 2 is a front view of the burner shown in FIG. 1.

Referring to FIGS. 1 and 2, a regenerative burner 10 for non-symmetrical combustion according to a first embodiment of the present invention is shown. The burner 10 includes a burner housing 11. The burner housing 11 defines a primary air inlet 12 and encloses a burner plenum 14. The primary air inlet 12 is in fluid communication with the burner plenum 14. The plenum 14 has a freeboard 16 defined above a bed of regenerative media 18. The media bed 18 is positioned within the plenum 14 and at least partially fills the plenum 14. The media bed 18 rests on a screen grate 20 positioned within the plenum 14 opposite the primary air inlet 12.

A baffle 22 is generally positioned between the plenum 14 and a burner port block 24. The burner port block 24 is connected to the baffle 22. A sidewall 26 of the burner port block 24 has a predetermined flare angle α, preferably between approximately 2° and approximately 30°. The burner port block 24 has a linear thickness (l) and an inside diameter (d) Preferably, the ratio of the linear thickness to the inside diameter (l/d) is greater than or equal to 0.6 and less than or equal to 1.0. The baffle 22 further includes a baffle face 28.

The burner 10 has a geometric or burner centerline 1. A fuel conduit 30 extends in a longitudinal direction within the burner housing 11 and is positioned coaxial with an offset centerline 2 relative to the geometric centerline 1, giving the burner 10 a non-symmetric configuration, i.e., the offset centerline or central axis 2 of the fuel conduit 30 is spaced a distance from the geometric centerline 1 of the burner 10. The fuel conduit 30 defines a fuel exit opening 31. The fuel conduit 30, in the embodiment shown in FIGS. 1 and 2, is nested within a combustion gas conduit 32. The conduit 32 is connected to an outside source for supplying combustion gas, such as air or fuel gas, as described further hereinafter.

The baffle 22 defines a primary stabilization cavity 34 immediately downstream of the fuel exit opening 31. The cavity 34 is in fluid communication with the fuel conduit 30 through the fuel exit opening 31. The conduit 32 extends through the burner plenum 14 and connects to the cavity 34. As shown in FIG. 1, the baffle 22 is concentrically positioned around the fuel conduit 30. The cavity 34 is preferably cylindrical-shaped and coaxial with the fuel conduit 30, but may also have tapered or concave sidewalls and be offset from the fuel conduit 30. The baffle 22 defines an air conduit 36 that extends into the burner housing 11 and connects to the burner plenum 14. The air conduit 36 defines an air opening 37. The air conduit 36 and the air opening 37 are positioned on an opposite side of the geometric centerline 1 from the fuel conduit 30 and the fuel exit opening 31. Preferably, the air conduit 36 and the air opening 37 are positioned a greater distance away from the geometric centerline 1 of the burner 10 than the fuel conduit 30 and the fuel exit opening 31. The air conduit 36 preferably has a cross-sectional shape in the form of a segment of a circle defined by a chord, as shown in FIG. 2, and includes a central axis 3. In addition, the fuel conduit 30 may be oriented parallel to, or diverge away from, the air conduit 36.

The burner 10 may be further equipped with an auxiliary fuel conduit 38. The auxiliary fuel conduit 38 defines an auxiliary fuel exit opening 39 to the burner port block 24. The auxiliary fuel conduit 38 extends through the burner plenum 14. As shown in FIG. 2, the auxiliary fuel conduit 38 and the auxiliary fuel exit opening 39 are radially spaced from the fuel conduit 30 and the fuel exit opening 31. The auxiliary fuel exit opening 39 is coterminous with the burner port block 24. In addition, the auxiliary fuel conduit 38 and the auxiliary fuel exit opening 39 are preferably positioned on the opposite side of the geometric centerline 1 from the air conduit 36 and the air opening 37 discussed previously. The auxiliary fuel conduit 38 includes a central axis 4 as shown in FIG. 1.

Figure 3:
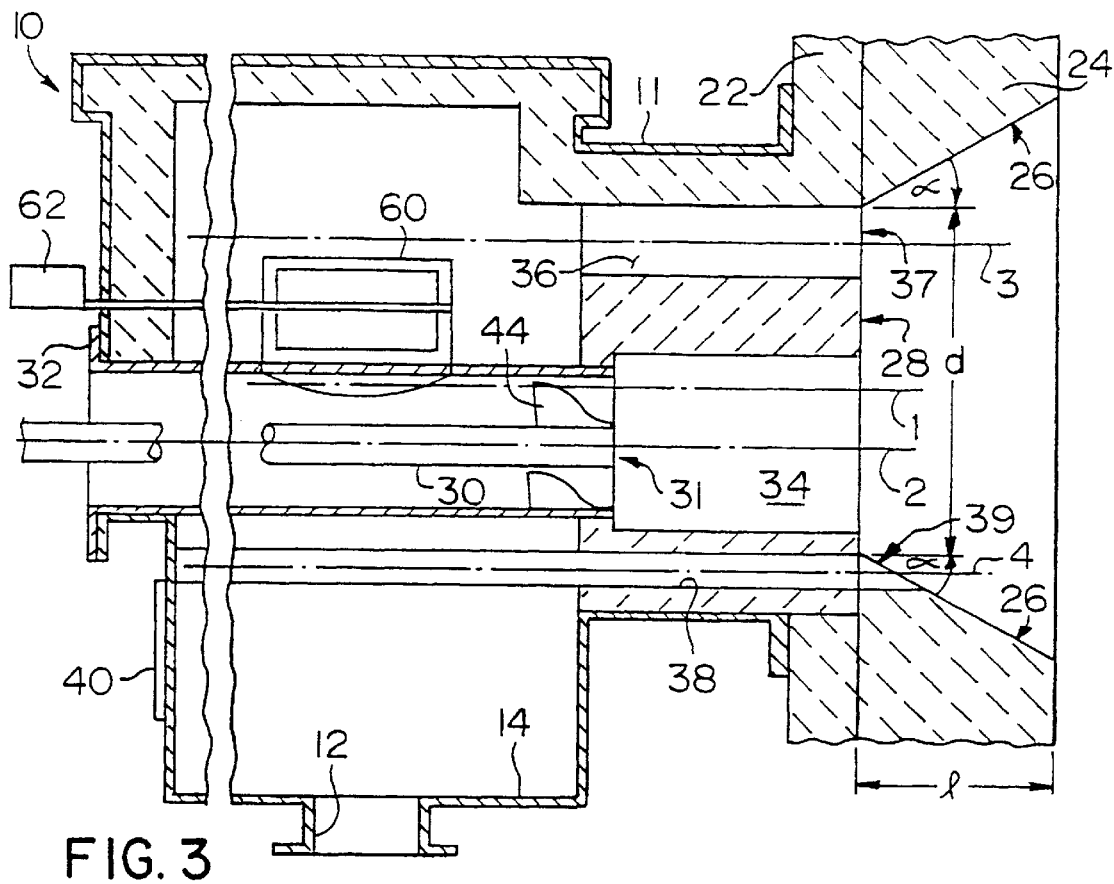
FIG. 3 is a cross-sectional view along a longitudinal axis of a recuperative burner for non-symmetrical combustion according to a second embodiment of the present invention.

A cleanout door 40 is positioned in a lower portion of the burner 10 and opens into the media bed 18. A fill door 42 serves as the top section of the burner 10, creating access to the media bed 18 for filling and leveling of the media bed 18. The freeboard 16 is in fluid communication with the burner port block 24 through the air conduit 36 and the air opening 37. Swirl vanes 44 may be provided in the conduit 32 and be peripherally spaced about the fuel conduit 30, as shown in FIG. 3. However, the swirl vanes 44 are optional in the embodiments of the invention shown in FIGS. 1 and 3.

In operation, combustion air enters the primary air inlet 12 and expands slightly in the burner plenum 14 for distribution through the screen grate 20. The combustion air then propagates through the media bed 18 and flows into the freeboard 16. Fuel is introduced through the fuel conduit 30 at a velocity of between about 400 and 1200 feet per second and exits the fuel exit opening 31 along the central axis 2 of the fuel conduit 30, or first axis. The combustion air is accelerated through the air conduit 36 to a velocity greater than 250 feet per second and exits the air opening 37 along the central axis 3 of the air conduit 36, or second axis. The combustion air velocity in the burner plenum 14 will be on the order of 40–60 feet per second, and in the freeboard 16 on the order of 60–80 feet per second.

The combustion air discharges as an air jet from the air opening 37 at the baffle face 28 into the burner port block 24. The air jet will, by Coanda Effect, tend toward the sidewall 26 of the burner port block 24 at approximately the flare angle $\alpha$. The discharging air jet and the fuel exiting the fuel exit opening 31 are then mixed in the opening defined by the burner port block 24 and ignited. Products of combustion from the combustion process, which have been partially cooled by giving up heat in the process, are recirculated back into the air jet discharging from the air opening 37 and into the void generated by the remaining blockage of the baffle 22. The main combustion air exiting the air opening 37 is vitiated by the recirculated products of combustion.

As stated previously, the air conduit 36 preferably has a cross-sectional shape in the form of a segment of a circle defined by a chord, as shown in FIG. 2. Hence, the air opening 37 also defines such a shape. The baffle 22 acts as a dam to retain the media bed 18 in place within the burner plenum 14 in the housing 11 of the burner 10. The chord geometry of the air opening 37 is advantageous in that it exposes the optimum amount of combustion air flow to the sidewall 26 of the burner port block 24, thus optimizing the benefits of the Coanda Effect. The sizing of the chord and, hence, the circle segment will depend on the parameters of the system in which the burner 10 is to be utilized, with the main design criteria being that the chord must be located appropriately to obtain a velocity for the combustion air of 250 feet per second or more through the air opening 37 into the burner port block 24.

An important feature of the present invention is that the fuel conduit 30 and the auxiliary fuel conduit 38 are, in operation, mutually exclusive. That is, although the burner 10 may be constructed with both, only one of the fuel conduit 30 and the auxiliary fuel conduit 38 is to be utilized at any one time. When the auxiliary fuel conduit 38 is used, the fuel is injected into the opening defined by the burner port block 24 along the central axis 4 of the auxiliary fuel conduit 38, or third axis.

In a cold startup situation of the burner 10, which occurs when the furnace temperature is less than 1600° F., a portion of the combustion air is delivered through the conduit 32, either axially or through the swirl vanes 44 shown in FIG. 3. Thus, a portion of the combustion air is delivered concentrically around the fuel jet injected from the fuel exit opening 31, and substantially parallel thereto. As stated previously, the swirl vanes 44 are optional in the burners 10 of FIGS. 1 and 3. The combustion air would then pass from the swirl vanes 44 into the primary stabilization cavity 34. Fuel is introduced through the fuel conduit 30 at a high velocity, preferably greater than 500 feet per second. As stated previously, the fuel conduit 30 may be parallel to, or it may be diverted away from, the air conduit 36. The divergent arrangement will increase the delay for mixing of the burner fuel and the combustion air.

After the furnace warms up to a temperature greater than 1600° F., the combustion air delivered to the conduit 32 is throttled back to less than 5% of the stoichiometric requirement. The high velocity fuel conduit 30 produces negative pressure regions in the cavity 34, with the resulting flue gasses being drawn back into the cavity 34 and vitiating the fuel jet prior to initiating combustion in the region of the burner port block 24. As mentioned previously, the main combustion air exiting the air opening 37 is also vitiated by recirculating products of combustion. It should be noted that the primary combustion air entering the conduit 32 in the burner 10 of FIG. 1, during cold startup, is not preheated.

Other features of the present invention shown in FIGS. 1 and 2 will now be discussed. When the mass velocity through the plenum 14 is high enough to fluidize the media bed 18, larger, heavier media bed elements may be placed in the upper portion of the plenum 14 to contain the media bed 18 and to prevent its fluidization. In addition, the screen grate 20 shown in FIG. 1 may be inclined at an angle between connecting points 50 and 52 to further reduce the size of the burner 10. This particular variation is represented by dashed line 54 in FIG. 1. The cleanout door 40 located adjacent the media bed 18 is in a low temperature region of the burner 10 and, consequently, does not require lining. The freeboard 16 advantageously permits the air exiting the media bed 18 to equalize prior to being accelerated through the air conduit 36. Conversely, the burner 10, when in its exhausting cycle, will have products of combustion firing back through the air opening 37 and the air conduit 36 into the freeboard 16 for equalization and penetration across the media bed 18.

The burner construction shown in FIGS. 1 and 2 is advantageous in that the conduit 32 and the fuel conduit 30 are positioned inside the regenerative media bed 18. Consequently, the conduit 32 and the fuel conduit 30 are not exposed to high temperature products of combustion during the exhausting cycle or to high air temperatures during the firing cycle of the burner 10. Therefore, these elements do not require insulation. The conduit 32 and the fuel conduit 30 are insulated by the media bed 18.

With the fuel introduced along the offset centerline 2 compared to the geometric centerline 1, the inventors have achieved test results suggesting that NOx emission levels may be reduced to approximately 25% of the levels achieved by burners having the fuel conduit located coaxial with the burner centerline and having two air slots symmetrically arranged about the fuel conduit. The preferred ratio of the linear thickness (l) between the baffle face 28 and the hot face of the burner port block 24 compared to the inside diameter (d) of the opening in the burner port block 24 at its upstream end should be equal to or less than 1, i.e., $l/d \leq 1.0$. This assures that recirculated products of combustion have been sufficiently cooled prior to coming into contact with the combustion air and the fuel gas. Additionally, this moves the combustion reaction farther away from the burner tile structure, reducing the generation of radiant heat.

A further variation of the present invention also shown in FIGS. 1 and 2 would be to construct the burner port block 24 so that the flare angle α at the upper portion of the burner port block 24 near the air opening 37 is less than the flare angle α at the lower end of the burner port block 24 closer to the fuel conduit 30 and the auxiliary fuel exit opening 39. This will assist in better recirculating the products of combustion to the fuel jet exiting the fuel exit opening 31 or the auxiliary fuel exit opening 39. The reduced flare angle α near the air opening 37 is shown in FIG. 1 by dashed line 56 and is indicated by angle "α'". When utilizing the auxiliary fuel conduit 38, the auxiliary fuel conduit 38 could be disposed axially or convergent up to an angle of 0 to –α°. The disposition of the auxiliary fuel conduit 38 depends on the desired location for initialing mixing of the fuel gas with the combustion air in the opening of the burner port block 24 and into the combustion furnace.

Referring now to FIG. 3, a recuperative version of the burner 10 is shown which is similar to the regenerative version discussed hereinabove. In this embodiment, the media bed 18 has been eliminated and a diverter valve 60 has been installed in the burner plenum 14, providing a connection between the interior of the conduit 32 and the burner plenum 14 for selective introduction of combustion gas, such as air, into the conduit 32. The diverter valve 60 may be controlled by a motor 62. Combustion air enters the air inlet 12 from an external recuperator (not shown), the details of which are well-known to those skilled in the art. The diverter valve 60 is open only during the cold startup phase (i.e., furnace temperature less than 1600° F.). Clearances around the diverter valve 60 permit a predetermined amount of leakage which supplies approximately up to 10% of the stoichiometric requirement of the combustion air through the conduit 32 when the diverter valve 60 is closed. In the recuperative version of the burner 10, the primary air, the air entering the cavity 34 and the secondary air passing through the air opening 37 are preheated. The swirl vanes 44 are also optional in this embodiment of the burner 10, as stated previously.

As will be apparent to those skilled in the art, the present invention is equally applicable, to both recuperative and regenerative applications. Whether a user chooses the recuperative or regenerative version depends, in large part, on the space restrictions for the furnace with which the burner 10 is to be used. The recuperative version generally requires less space than the regenerative version.

The air velocity is maintained greater than or equal to 250 feet per second throughout. Once the temperature in the furnace exceeds 1600° F., the fuel gas supply through the conduit 32 is shut off. All of the stoichiometric fuel gas then exits the fuel conduit 30 at a speed greater than 500 feet per second.

Figure 4:
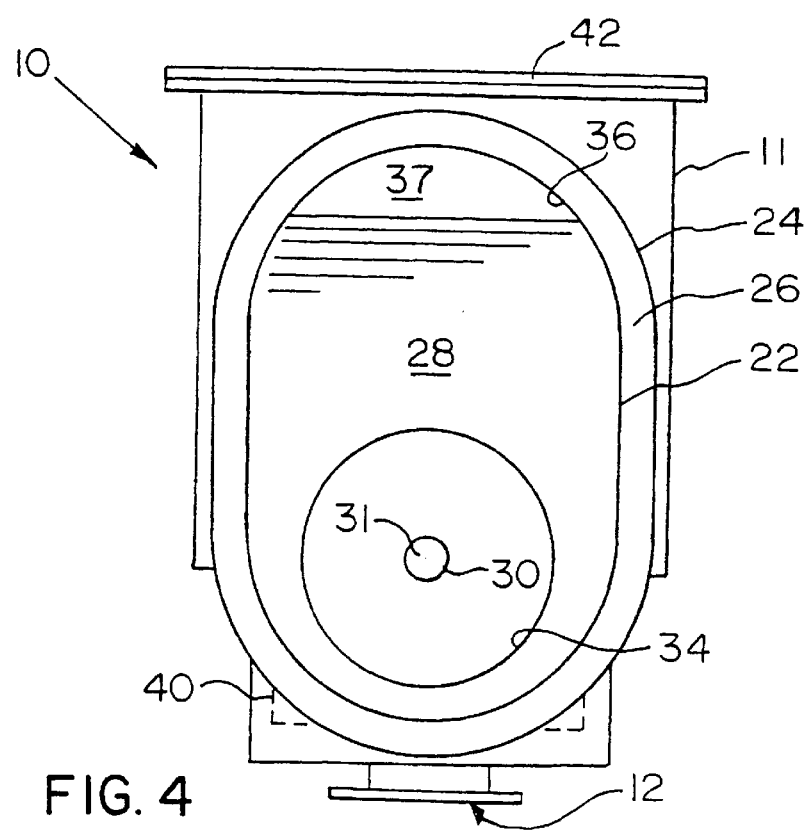
FIG. 4 is a front view of a burner for non-symmetrical combustion having an elongated burner port block according to a third embodiment of the present invention.

FIG. 4 shows a third embodiment of the burner 10. The burner 10 shown in FIG. 5 has an elongated burner port block 24. This configuration provides further separation between the fuel exit opening 31 and the air opening 37. The increased separation permits additional furnace flue gas to recirculate back into the area between the fuel jet exiting the fuel exit opening 31 and the air stream exiting the air opening 37. Combustion is started inside the furnace wall in a traditional manner and the burner 10 shown in FIG. 5 operates in an otherwise similar manner to the burners 10 discussed hereinabove. Testing of the configuration shown in FIG. 4 indicates that an angle on the fuel jet 31, away from the air jet at between about 3° and 10°, facilitates a lower NOx production than having the fuel parallel to the air jet stream.

The inventors have tested the recuperative version of the burner 10 shown in FIG. 3. A table of actual test results follows:

TABLE 1

| α | 1/d | Air preheat temperature (degrees F) | Furnace temperature (degrees F) | NOx (ppm) |
|---|---|---|---|---|
| 30° | 1 | 800° | 2400° | 25 |
| 2.8° | 1 | 800° | 2400° | 55 |
| TRADITIONAL | 1 | 800° | 2400° | 110 |

Table 1 shows that, with the flare angle α at 2.8°, a 50% reduction in NOx was observed compared to symmetrical combustion with a burner having a fuel jet disposed axially along the centerline of the burner and with two symmetrical air jets radially spaced from the fuel jet in the traditional configuration. Furthermore, when the flare angle α was equal to 30°, a 75% reduction in NOx compared to the same type of symmetrical or "axial" burner was realized. The results for a traditional approach using a traditional configuration are shown in Table 1 for comparison.

The configuration of the air opening 37 in the form of a circle segment defined by a chord is advantageous for two additional reasons. First, this configuration is easier to mold in the baffle 22. Second, the chord configuration provides a better dam for the elements in the media bed 18 in the regenerative version of the invention.

Further variations and modifications of the above-described invention may be made without departing from the spirit and scope of the present invention. The scope of the present invention is defined by the appended claims and equivalents thereto.

What is claimed is:

1. A burner for non-symmetrical combustion, comprising:
   a burner housing enclosing a burner plenum;
   a fuel conduit extending longitudinally within the housing and positioned coaxial with a line spaced from a central axis of the burner, with the fuel conduit defining a fuel exit opening;
   an air conduit extending into the housing, with the air conduit defining an air opening on an opposite side of the burner central axis from the fuel exit opening;
   a baffle positioned at least partially around the fuel conduit and defining the air conduit; and
   a burner port block connected to the baffle downstream of the air opening and having a diverging sidewall located downstream of and in fluid communication with the fuel conduit and the air conduit.

2. The burner of claim 1, wherein the air conduit has a cross-sectional shape in the form of a segment of a circle defined by a chord.

3. The burner of claim 1, wherein the baffle further defines a primary stabilization cavity immediately adjacent the fuel exit opening, with the cavity in fluid communication with the fuel conduit through the fuel exit opening.

4. The burner of claim 3, wherein the cavity is cylindrical-shaped and coaxial with the fuel conduit.

5. The burner of claim 3, wherein the sidewall of the burner port block diverges from the burner central axis.

6. The burner of claim 1, wherein the sidewall diverges at a flare angle of between 2° and 30°.

7. The burner of claim 3, wherein the baffle separates the burner port block from the burner plenum, wherein a combustion gas conduit extends through the burner plenum and connects to the cavity, and wherein the fuel conduit is positioned within the combustion gas conduit.

8. The burner of claim 7, further comprising swirl vanes positioned within the combustion gas conduit and peripherally spaced around the fuel conduit.

9. The burner of claim 1, further comprising an auxiliary fuel conduit extending through the burner plenum and connecting to the burner port block, with the auxiliary fuel conduit defining an auxiliary fuel exit opening radially spaced from the fuel exit opening and coterminous with the burner port block.

10. The burner of claim 9, wherein the auxiliary fuel exit opening is positioned on the opposite side of the burner central axis from the air opening.

11. The burner of claim 1, wherein the burner plenum is at least partially filled with heat transfer media.

12. The burner of claim 1, wherein the burner plenum is connected to a diverter valve configured to selectively admit combustion gas into the combustion gas conduit.

13. A burner for non-symmetrical combustion, comprising:
   a burner housing enclosing a burner plenum;
   a fuel conduit extending longitudinally within the housing and positioned coaxial with a line spaced from a central axis of the burner, with the fuel conduit defining a fuel exit opening;
   an air conduit extending into the housing, with the air conduit defining an air opening on an opposite side of the burner central axis from the fuel exit opening, and wherein the air opening is positioned a greater distance away from the burner central axis than the fuel exit opening;
   a baffle positioned at least partially around the fuel conduit and defining the air conduit; and
   a burner port block connected to the baffle downstream of the air opening and having a diverging sidewall located downstream of and in fluid communication with the fuel conduit and the air conduit.

14. The burner of claim 13, wherein the air conduit has a cross-sectional shape in the form of a segment of a circle defined by a chord.

15. The burner of claim 13, wherein the baffle further defines a primary stabilization cavity immediately adjacent the fuel exit opening, with the cavity in fluid communication with the fuel conduit through the fuel exit opening.

16. The burner of claim 15, wherein the sidewall of the burner port block diverges from the burner central axis.

17. The burner of claim 16, wherein the sidewall diverges at a flare angle of between 2° and 30°.

18. The burner of claim 15, wherein the baffle separates the burner port block from the burner plenum, wherein a combustion gas conduit extends through the burner plenum and connects to the cavity, and wherein the fuel conduit is positioned within the combustion gas conduit.

19. The burner of claim 13, further comprising an auxiliary fuel conduit extending through the burner plenum and connecting to the burner port block, with the auxiliary fuel conduit defining an auxiliary fuel exit opening radially spaced from the fuel exit opening and coterminous with the burner port block.

20. A method of non-symmetric combustion in a burner, comprising the steps of:
   providing a burner, with the burner comprising:
      a fuel conduit coaxial with a first axis;
      an air conduit coaxial with a second axis;
      a baffle positioned at least partially around the fuel conduit and defining the air conduit; and
      a burner port block connected to the baffle downstream of the air opening and having a diverging sidewall and in fluid communication with the fuel conduit and air conduit;
   injecting fuel through the fuel conduit into the burner port block along the first axis, with the first axis spaced from a central axis of the burner;
   discharging combustion gas through the air conduit into the burner port block along the second axis, with the second axis positioned on an opposite side of the burner central axis from the first axis;
   inducing the combustion gas to flow toward the diverging sidewall of the burner port block;
   mixing the combustion gas and the injected fuel;
   igniting the mixed combustion gas and injected fuel; and
   recirculating products of combustion into the discharging combustion gas.

21. The method of claim 20, wherein the discharging combustion gas discharges at a velocity of greater than about 250 feet per second into the opening.

22. The method of claim 20, further including the step of injecting the fuel along a third axis radially spaced from the first axis in place of the step of injecting the fuel along the first axis.

* * * * *